United States Patent Office 3,106,851
Patented Oct. 15, 1963

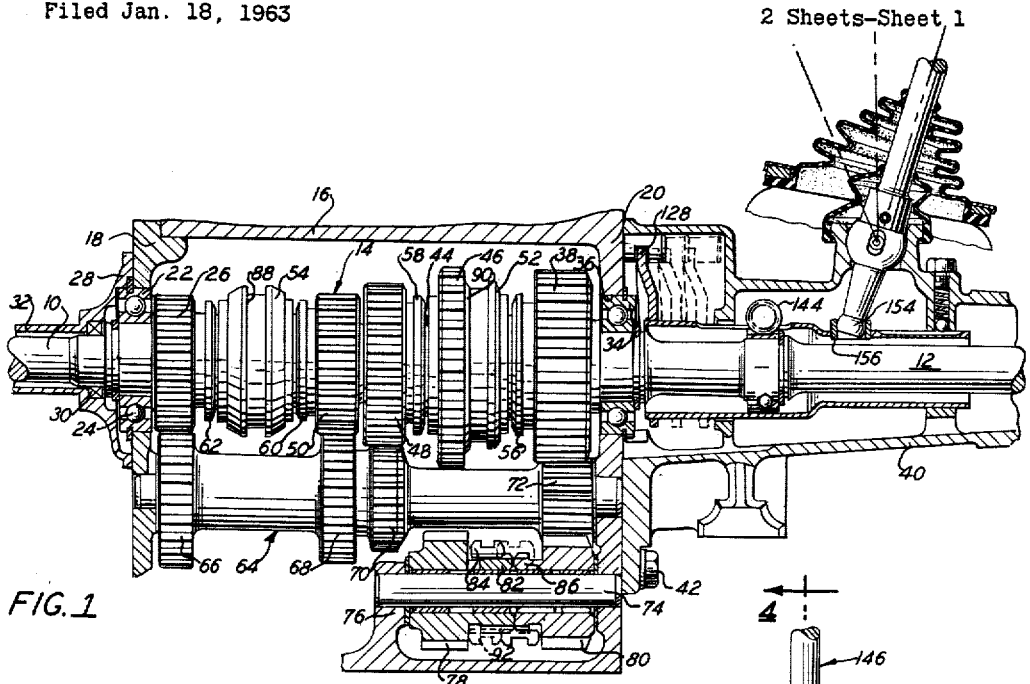

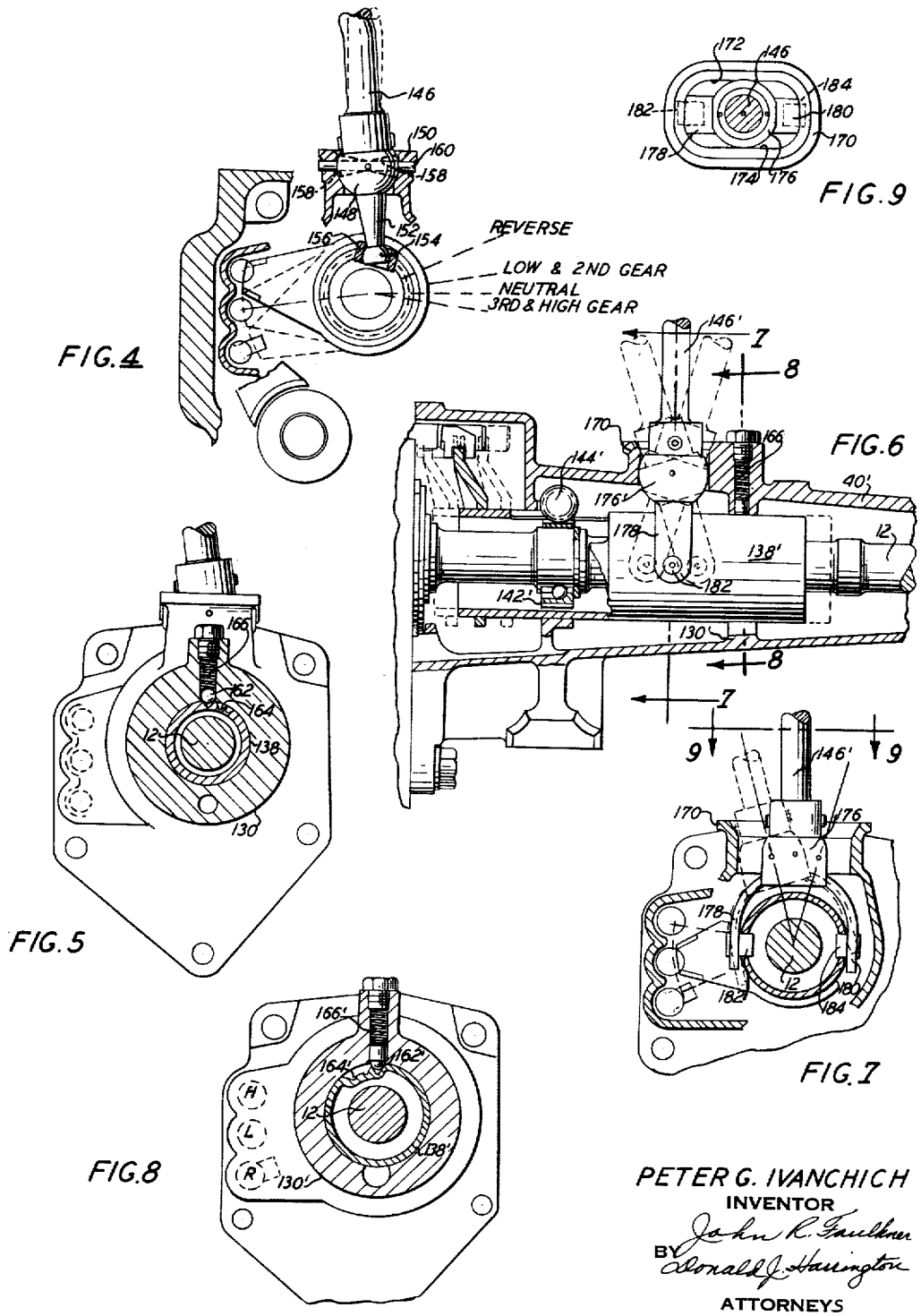

3,106,851
POWER TRANSMISSION CONTROL LINKAGE
Peter G. Ivanchich, Dearborn, Mich., assignor to Ford Motor Company, Dearborn, Mich., a corporation of Delaware
Filed Jan. 18, 1963, Ser. No. 252,460
5 Claims. (Cl. 74—335)

My invention relates generally to remote controls for multiple speed ratio power transmission mechanisms, and more particularly to improvements in driver operated controls for automotive vehicle power transmission mechanisms.

I am aware of several control arrangements for automotive vehicle transmission mechanisms. These normally include shiftable clutch members or gear elements that may be actuated by a driver controlled mechanical linkage system. Speed ratio shifts then can be accomplished by appropriately moving the linkage system through a pre-determined motion pattern. Such transmission mechanisms employ a so-called neutral clutch that is situated between the vehicle engine and the gear elements of the gear unit, and the driven gear element of the mechanism is drivably connected to the vehicle traction wheels through a tailshaft, a driveshaft and a differential and axle shaft assembly. During a shift sequence, torque delivery is interrupted by releasing the neutral clutch.

The linkage system in such conventional mechanisms is located usually at one side of the housing for the gear unit or at the top of the housing. Both of these arrangements have disadvantages since they each require an undesirable space penalty, especially in contemporary vehicle drive line installations. They require also relatively complex motion transmitting levers.

According to a principal feature of my invention, I have overcome the foregoing disadvantages by providing a control arrangement having its principal parts disposed in a convenient portion of the transmission assembly, such as in the transmission tailshaft extension housing. It is capable of being used with any of a variety of known transmission arrangements with a minimum amount of modification being required to adapt it for any particular environment. The provision of an improved control mechanism of this type is an object of my invention.

It is another object of my invention to provide a control mechanism for a multiple speed ratio power transmission that eliminates the need for providing external motion transmitting levers and which may be controlled by a vehicle operator from within the vehicle passenger compartment by means of a simple shift lever fulcrumed upon a stationary portion of the drive line such as the transmission tailshaft extension housing.

It is a further object of my invention to provide a gear motion controlling mechanism for use with an automotive vehicle power transmission mechanism that includes a control member capable of being rotatably and axially adjusted with a compound motion so that any one of several transmission ratio shifts can be accomplished selectively.

It is a further object of my invention to provide a control mechanism of the type above set forth wherein a minimum amount of space and a minimum number of movable elements are required.

It is a further object of my invention to provide a control mechanism of the type above set forth and which can be adapted readily for use with transmission mechanisms having any number of forward and reverse driving speed ratios.

For the purpose of describing more particularly my improved structure, reference will be made to the accompanying drawings wherein:

FIGURE 1 shows in cross-sectional form my improved shift controlling mechanism in combination with a four speed ratio power transmission mechanism;

FIGURE 2 is a cross-sectional view showing a shift rail arrangement for the mechanism of FIGURE 1. It is taken along a plane that is parallel to the plane of the section of FIGURE 1;

FIGURE 3 is a transverse cross-sectional view taken along the plane of section line 3—3 of FIGURE 2;

FIGURE 4 is a transverse cross-sectional view taken along the plane of section line 4—4 of FIGURE 2;

FIGURE 5 is a transverse cross-sectional view taken along the plane of section line 5—5 of FIGURE 2;

FIGURE 6 is a view similar to the view of FIGURE 2 showing an alternate construction with a manually operable lever in three alternate operating positions;

FIGURE 7 is a transverse cross-sectional view taken along section line 7—7 of FIGURE 6;

FIGURE 8 is a view similar to that of FIGURE 5 showing an alternate construction;

FIGURE 9 is a view taken along the plane of section line 9—9 of FIGURE 7; and

FIGURE 10 shows a shift pattern for the embodiment of FIGURES 6 through 9.

Referring first to FIGURE 1, numeral 10 designates a power input shaft which may be connected to a vehicle engine, such as an internal combustion engine, by means of a neutral clutch, not shown. The clutch, of course, can be controlled in the usual fashion by a driver operated release lever. A power output driven shaft or tail shaft is designated by reference character 12. Multiple speed ratio gearing, indicated generally by reference character 14, forms a plurality of torque delivery paths between the shafts 10 and 12. The gearing 14 is enclosed within a transmission housing 16 which in turn can be connected in the usual fashion to the cylinder block of the internal combustion engine.

Housing 16 includes a forward wall 18 and a rearward wall 20. The wall 16 is formed with a bearing opening 22 for accommodating a bearing 24 which journals shaft 10 and a power input gear 26. This gear 26 is connected integrally to shaft 10 or is secured thereto in fixed relationship.

A bearing retainer 28 is bolted to the front end of the wall 18. It defines a seal chamber 30 and serves as a support for a stationary clutch bearing retainer sleeve shaft 32.

One end of the power output shaft 12 is journalled by means of a bearing 34 within a bearing opening 36 formed in the end wall 20. A power output gear 38 is journalled upon shaft 12.

Shaft 12 extends axially through an extension housing 40 that is bolted by bolts 42 to the end wall 20 as indicated.

Gear unit 14 includes an intermediate gear supporting shaft 44 which is supported at one end within an appropriate bearing positioned in gear 26. It is connected at its other end to shaft 12. Journalled upon intermediate shaft 44 is a second speed ratio gear 48 and a third speed ratio gear 50.

A first synchronizer clutch sleeve 52 is carried by the intermediate shaft 44 and is adapted to shift axially relative thereto, although relative angular motion of sleeve 52 with respect to shaft 44 is inhibited. Sleeve 52 carries a reverse gear 46. Similarly, a second synchronizer clutch sleeve 54 is connected to the intermediate shaft 44. Like sleeve 52, sleeve 54 may move axially relative to shaft 44, but relative rotation between these members is inhibited.

An externally toothed clutch element 56 is carried by gear 38 and an externally toothed clutch element 58 is carried by gear 48. In a similar fashion, externally toothed clutch elements 60 and 62 are carried respectively by gears 50 and 26.

Thus when sleeve 52 is shifted in a right-hand direction as viewed in FIGURE 1, gear 38 becomes drivably connected to the intermediate shaft 44. Intermediate shaft 44 in turn is positively connected to shaft 12 as previously indicated.

If the synchronizer clutch sleeve 52 is shifted in a left-hand direction as viewed in FIGURE 1, its internal teeth engage external teeth of the element 58 thus locking gear 48 to the power output shaft 12.

If synchronizer clutch sleeve 54 is shifted in a right-hand direction as viewed in FIGURE 1, gear 50 becomes locked to power output shaft 12. On the other hand, if clutch sleeve 54 is shifted in a left-hand direction as viewed in FIGURE 1, a direct driving connection between shaft 10 and shaft 12 is established.

A cluster gear assembly is indicated generally by reference character 64. Cluster gear assembly 64 includes a first driving gear 66, a second gear 68, a third gear 70 and a fourth gear 72. These gears engage respectively gears 26, 50, 48 and 38.

The transmission assembly includes also a second countershaft 74 that is end supported by wall 20 and by a suitable boss 76. This boss 76 and the wall 20 are apertured to receive shaft 74 as indicated.

A pair of reverse idler pinions 78 and 80 is journalled upon shaft 74. A clutch sleeve guide or extension 82 is carried by pinion 78. It is externally splined to permit a driving connection with an internally splined clutch sleeve 84.

Pinion 80 includes also an extension 86 which is formed with external clutch teeth that are adapted to engage internal teeth of sleeve 84 when the latter is moved in a right-hand direction as viewed in FIGURE 1. When this occurs, a driving connection is established between pinions 78 and 80. On the other hand, when the sleeve 84 assumes a left-hand position as viewed in FIGURE 1, the driving connection between pinions 78 and 80 is interrupted.

The shaft 74 and its associated pinions 78 and 80 are shown out of position in FIGURE 1 for purposes of clarity. It will be understood, however, that pinion 80 engages continuously gear 72 which in turn continuously engages gear 38. Furthermore, pinion 78 engages continuously reverse gear 46.

During reverse drive operation, the gear 46 assumes a neutral position intermediate the extreme left-hand position and the extreme right-hand position, as viewed in FIGURE 1. Clutch sleeve 84 during reverse drive operation is shifted in a right-hand direction. It thus will be apparent that the torque delivery path during reverse drive operation will be comprised of shaft 10, gear 26, gear 66, gear 72, pinion 80, pinion 78 and gear 46, the latter being connected drivably to shaft 12 as previously indicated. During such reverse drive operation, both the synchronizer clutch sleeves 52 and 54 assume an intermediate neutral position.

To establish low speed ratio operation, the sleeve 84 is shifted to a left-hand position as viewed in FIGURE 1, and the sleeve 52 is shifted in a right-hand direction as previously indicated. Thus the torque delivery path is defined by shaft 10, gear 26, gear 66, gear 72 and gear 38.

During operation in the second speed ratio, the torque delivery path is defined by shaft 10, gear 26, gear 66, gear 70 and gear 48. During third speed ratio operation, the torque delivery path is defined by shaft 10, gear 26, gear 66, gear 68 and gear 50.

Synchronizer clutch sleeve 54 is formed with an annular groove 88, and a corresponding groove 90 is formed on synchronizer clutch sleeve 52. The clutch sleeve 84 carried by the reverse idler shaft 74 also is formed with an annular groove as indicated at 92.

A shifter fork is situated within each of these grooves 88, 90 and 92. The groove 90 is adapted to receive the ends 94 and 96 of a shifter fork 98. This fork 98 is carried by a first shifter fork shift rail 100 which is received through a boss 102 formed on the fork 98.

As best seen in FIGURE 2, rail 100 is supported by end wall 20 and by an intermediate supporting wall 104. These walls form a part of the transmission housing. Shaft 100 is received through aligned openings in wall 20 and in wall 104.

A reverse shifter fork is shown at 106 in FIGURES 2 and 3. It includes a portion 108 that is received within groove 92 formed in clutch sleeve 84. Fork 106 includes a boss 110 that is fixed to a reverse shift rail 112. Aligned openings are formed in walls 20 and 104 for the purpose of receiving and supporting the ends of shift rail 112.

A third shift rail is shown at 114. It is received slidably within aligned openings formed in wall 20, wall 106 and forward wall 18. A third shifter fork 116 is carried by rail 114. It may be similar in form to shifter fork 98 and, like fork 98, may be formed with ends that are received within groove 88 of the synchronizer clutch sleeve 54. It will be apparent therefore that as shift rails 114, 100 and 112 are moved axially, the respective shifter forks will adjust the axial position of the synchronizer clutch sleeves 54 and 52 and clutch sleeve 84. Speed ratio changes can be accomplished by introducing an appropriate shift pattern for the shift rails.

To prevent simultaneous movement of two shift rails from a neutral position, an interlock is provided. This comprises interlock plungers 118 and 120 which are adapted to register with cooperating recesses formed on one side of rail 112, on one side of rail 114, and on both sides of rail 100. An interlock pin 122 may be provided within a transverse opening formed in rail 100 which interconnects the recesses on either side thereof. As rail 114 is shifted from a neutral position, plunger 120 is moved into mating engagement with the adjacent recess of rail 100. This in turn actuates also pin 122 which moves plunger 118 into mating engagement or registry with the adjacent recess in rail 112. Thus, as rail 114 is shifted from a neutral position to either the high speed ratio position or the third speed ratio position, shifting movement of the rails 100 and 112 will be inhibited.

On the other hand if rail 100 is shifted from a neutral position, both plungers 120 and 118 will be moved into registry with the cooperating recesses in rails 114 and 112, respectively, thus inhibiting movement of the rails 114 and 112 while the transmission is operating in the low speed ratio or the second speed ratio.

If the reverse shift rail 112 is moved from a neutral position to the reverse driving position, plunger 118 will be moved into registry with the recess in rail 100. Pin 122 then will shift plunger 120 into registry with the cooperating recess in rail 114. Thus shifting movement of rails 100 and 114 will be inhibited during reverse drive operation.

A spring loaded detent plunger 124 is situated within a cooperating opening that communicates with the opening in the wall 104 through which shift rail 112 extends. It normally is spring biased into engagement with either of two detent recesses depending upon the position of shift rail 112. These recesses define either of the two operating positions for the rail 112. In a similar fashion, a spring loaded detent plunger 126 is formed in another opening in the wall 112. This opening communicates with the opening in the wall 112 through which rail 114 extends. It is adapted to register with either of three detent recesses formed in rail 114 which respectively define the three operating positions for the rail 114.

A similar spring loaded detent arrangement may be provided for rail 100, although it has not been illustrated particularly in the drawings. The detent recesses for the rail 100, however, are apparent from an inspection of FIGURE 2.

Shift rails 112, 100 and 114 extend into the transmission extension housing 40. Each of them is formed with a slot or recess that is adapted to receive the radially outward end of a shifter finger 128.

Disposed within the housing portion 20 is a pair of spaced bosses 130 and 132. These bosses are in the form of separating walls with apertures 134 and 136 respectively. Disposed within these apertures 134 and 136 is a tubular shift member 138. It is received slidably within the apertures 134 and 136 and is capable of being moved axially with respect to the center line or axis of the transmission mechanism or rotated about an axis parallel to the axis of the transmission. The shift member 138 is received over the power output tailshaft 12.

Member 138 can be formed with an opening 140 to permit driving engagement between a speedometer worm gear and a speedometer cable drive worm 144. The worm gear is carried drivably in the usual fashion by the tailshaft 12.

By rotating the shift member 138 about its axis, the angular position of the finger 128 can be changed. As shown in FIGURE 4, there are three principal positions for the finger 128 corresponding to the positions of the shift rails 114, 100 and 112.

When the finger 128 is moved into alignment with the recess in shift rail 114, a connection is established between the member 138 and shift rail 114. If the member 138 then is shifted axially, the shift rail 114 will be pulled or pushed, depending upon the direction of the shifting movement of the member 138. The same is true for the other shift rails 100 and 112. Upon movement of the finger 128 to the position corresponding to shift rail 100, a connection is established between member 138 and shift rail 100. The shift rail 100 thus can be moved from the first speed ratio position to the second speed ratio position or to an intermediate position, the latter corresponding to neutral.

As the finger 128 is moved into engagement with the recess in shift rail 112, the shifter fork 106 can be moved into and out of the reverse drive position.

Shifting and rotary movement of the member 138 is accomplished by a manually controlled selector shaft indicated generally by reference character 146. This shaft includes a ball portion 148 that is received within a socket portion 150, the latter preferably forming a part of the tailshaft extension housing 40. I contemplate, however, that portion 150 may be separate from the extension housing and bolted thereto during assembly. Portions 148 and 150 thus form a ball and socket joint which acts as a fulcrum for the lever 146.

One end 152 of the lever 146 extends inwardly into the tailshaft extension housing 40. It may be rounded, as shown at 154, and received within a tubular collar 156 secured in a fixed fashion to member 138.

The ball portion 148 is formed with an elongated transverse opening 158 through which is received an anchor pin 160. This pin is received through cooperating openings in the ball and socket portion 150 and serves to anchor the lever 146. The lever 146 can be rotated about the axis of the pin 160 or it can be rotated in a plane that contains the axis of the pin 160. Thus a universal movement of the lever 146 can be accommodated. It will be apparent, therefore, that either a shifting movement or a rotary motion of the member 138 can be obtained by appropriately manipulating the lever 146.

The spacing of the shift rails 114, 100 and 112 can be arranged in such a way that the cooperating end of the finger 128 can move from one rail slot or recess to the other only if the slots are aligned. This can occur, of course, only if the rails themselves are in a neutral position since two shift rails cannot be actuated simultaneously by reason of the interlock mechanism described previously.

If the operator inadvertently rotates the member 138 while the cooperating shift rail assumes a position other than a neutral position, it will not be possible for the end of the finger 128 to move out of registry with the cooperating rail slot due to interference with the adjacent rail.

As best seen in FIGURE 4, the slotted opening 158 can be tapered toward the center of the ball portion 148 so that the pin 160 engages the center of the ball portion 148, although tilting movement of the lever 146 can be accommodated.

In FIGURE 5, I have shown a detent for establishing three operating angular positions for the member 138. This detent includes a spring-loaded detent ball 162 that is spring biased into engagement with any one of three angularly spaced detent recesses 164 by a detent spring 166. Ball 162 and spring 166 are disposed in a radial opening formed in the wall 130.

The detent recesses 164 define three angular positions for the member 138 which respectively correspond to the positions of the shift rails 114, 100 and 112.

In FIGURES 6, 7, 8 and 9, I have illustrated an alternate embodiment of my invention, although several portions of this structure have elements that are common to the embodiment of FIGURES 1 through 5. For purposes of convenience, the elements of the embodiment of FIGURES 6 through 9 that have corresponding elements in the embodiments of FIGURES 1 through 5 are illustrated with similar reference numerals although primed notations have been added.

In the second embodiment, the tailshaft extension housing 40' is formed with an elongated socket portion 170. As best seen in FIGURE 9, portion 170 defines an elongated opening having generally parallel sides 172 and 174. Ball member 176 is received within the opening and is adapted to bear against sides 172 and 174.

As viewed in FIGURE 7, ball portion 176 can be oscillated about the axis of the power output shaft 12 in either a clockwise direction or a counterclockwise direction. A pair of fork arms 178 and 180 is carried by shift lever 146'. Arms 178 and 180 depend from ball portion 176' and are rigidly secured thereto. The extremities of the arms 178 and 180 carry fulcrum members 182 and 184 respectively. These members are received within cooperating openings formed on diametrically opposite sides of the member 138'.

Thus as the shift lever 146' is rotated in a clockwise or counterclockwise direction as viewed in FIGURE 7, member 138' similarly is rotated. On the other hand, if the shift lever 146' is shifted in a clockwise or counterclockwise direction as viewed in FIGURE 6, member 138' will be shifted axially in one direction or the other depending upon the direction of the rotation of shift lever 146'. The walls 172 and 174 will act as the reaction means during axial shifting movement of the member 138'.

The choice of one embodiment or the other may depend in part upon the location of the shift rails in any particular transmission environment or upon the shift pattern that is desired. The shift pattern that may be obtained by employing the structure of FIGURES 6, 7 and 8 is shown in FIGURE 10. It will be apparent, of course, that the direction of the rotary motion of the member 138' for any given shifting movement of the lever 146' will be opposite to the direction of the rotation of the member 138 in the first embodiment for a corresponding shifting movement of the levers 146' or 146.

Having thus described preferred embodiments of my invention, what I claim and desire to secure by United States Letters Patent is:

1. In a multiple speed ratio power transmission mechanism having gear elements defining plural torque delivery paths between a driving member and a driven member, said gear elements being disposed within a transmission housing, said driven member extending through a housing extension, a shift member mounted within and supported by said housing extension, said shift member surrounding said driven member and adapted for axial shifting movement in a first direction to a first operating position and in the opposite direction to a second operating position, said shift member being adapted also for rotary movement, gear motion controlling means for conditioning said gear elements for movement at selected speeds relative to the speed of said driving member whereby speed ratio changes can be accomplished, a selector portion operatively connected to said shift member, and means for establishing a mechanical connection between said selector portion and movable portions of the controlling means for said gear elements whereby said transmission mechanism can be conditioned for operation in a selected speed ratio in response to axial and rotary movement of said shift member.

2. In a multiple speed ratio power transmission mechanism having gear elements defining plural torque delivery paths between a driving member and a driven member, said gear elements being disposed within a transmission housing, said driven member being situated within an extension of said housing, a shift member mounted within and supported by said housing extension, said shift member surrounding said driven member and being adapted to shift in one direction to a first operating position and in the opposite direction to a second operating position, said shift member being adapted also for rotary movement, gear motion controlling means for conditioning said gear elements for movement at selected speeds relative to said driving member whereby speed ratio changes can be accomplished, said gear motion controlling means including a plurality of shiftable members, and means for establishing selectively a mechanical connection between the individual shiftable members of said controlling means and said selector portion upon rotary movement of said shift member whereby said shiftable members can be shifted to condition said transmission mechanism for operation in a selected speed ratio.

3. In a multiple speed ratio power transmission mechanism having gear elements defining plural torque delivery paths between a driving member and a driven member, said gear elements being disposed within a transmission housing, said driven member being situated within an extension of said housing, a shift member mounted within and supported by said housing extension, said shift member surrounding said driven member and being adapted to shift in one direction to a first operating position and in the opposite direction to a second operating position, said shift member being adapted also for rotary movement, gear motion controlling means for conditioning said gear elements for movement at selected speeds relative to said driving member whereby speed ratio changes can be accomplished, said gear motion controlling means including a plurality of shiftable members, means for establishing selectively a mechanical connection between the individual shiftable members of said controlling means and said selector portion upon rotary movement of said shift member whereby said shiftable members can be shifted to condition said transmission mechanism for operation in a selected speed ratio, and a shift lever journalled upon said extension and extending outwardly therefrom, one end of said shift lever extending within said extension and being mechanically connected to said shift member whereby shifting movement and rotary movement of said shift member can be accomplished by appropriately manipulating the extended end of said shift lever.

4. In a multiple speed ratio power transmission mechanism having gear elements defining plural torque delivery paths between a driving member and a driven member, said gear elements being disposed within a transmission housing, said driven member being situated within an extension of said housing, a shift member mounted within and supported by said housing extension, said shift member surrounding said driven member and being adapted to shift in one direction to a first operating position and in the opposite direction to a second operating position, said shift member being adapted also for rotary movement, gear motion controlling means for conditioning said gear elements for movement at selected speeds relative to said driving member whereby speed ratio changes can be accomplished, said gear motion controlling means including a plurality of shiftable members, means for establishing selectively a mechanical connection between the individual shiftable members of said controlling means and said selector portion upon rotary movement of said shift member whereby said shiftable members can be shifted to condition said transmission mechanism for operation in a selected speed ratio, and a shift lever journalled upon said extension and extending outwardly therefrom, one end of said shift lever extending within said extension and being mechanically connected to said shift member whereby shifting movement and rotary movement of said shift member can be accomplished by appropriately manipulating the extended end of said shift lever, the connnection between said shift lever and said housing extension comprising cooperating portions that define a universal connection.

5. In a multiple speed ratio power transmission mechanism having gear elements defining plural torque delivery paths between a driving member and a driven member, said gear elements being disposed within a transmission housing, said driven member being situated within an extension of said housing, a shift member mounted within and supported by said housing extension, said shift member surrounding said driven member and being adapted to shift in one direction to a first operating position and in the opposite direction to a second operating position, said shift member being adapted also for rotary movement, gear motion controlling means for conditioning said gear elements for movement at selected speeds relative to said driving member whereby speed ratio changes can be accomplished, said gear motion controlling means including a plurality of shiftable members, and means for establishing selectively a mechanical connection between the individual shiftable members of said controlling means and said selector portion upon rotary movement of said shift member whereby said shiftable members can be shifted to condition said transmission mechanism for operation in a selected speed ratio, a shift lever connected pivotally to said shift member and extending outwardly from said extension, movement of said shift lever about the axis of said driven member thereby being accompanied by corresponding rotary movement of said shift member and movement of said shift lever in a plane which contains the axis of said shift member being accompanied by shifting movement of said shift member.

References Cited in the file of this patent
UNITED STATES PATENTS

| | | |
|---|---|---|
| 2,694,943 | Brumbaugh | Nov. 23, 1954 |
| 3,064,493 | Popovich et al. | Nov. 20, 1962 |

UNITED STATES PATENT OFFICE
CERTIFICATE OF CORRECTION

Patent No. 3,106,851                          October 15, 1963

Peter G. Ivanchich

It is hereby certified that error appears in the above numbered patent requiring correction and that the said Letters Patent should read as corrected below.

Column 7, lines 30 and 51 and 52, and column 8, lines 15 and 46, after "accomplished,", each occurrence, insert -- a selector portion operatively connected to said shift member, --.

Signed and sealed this 31st day of May 1966.

(SEAL)
Attest:

ERNEST W. SWIDER                        EDWARD J. BRENNER
Attesting Officer                             Commissioner of Patents